US005649692A

United States Patent [19]
Gilsdorf et al.

[11] Patent Number: 5,649,692
[45] Date of Patent: Jul. 22, 1997

[54] VIBRATION DAMPER AND PNEUMATIC SUSPENSION SYSTEM

[75] Inventors: Heinz-Joachim Gilsdorf, Donnersdorf; Joachim Kühnel, Dittelbrunn; Michael Hurrlein, Elfershausen, all of Germany

[73] Assignee: Fichtel & Sachs AG, Schweinfurt, Germany

[21] Appl. No.: 407,586

[22] Filed: Mar. 20, 1995

[30] Foreign Application Priority Data

Mar. 18, 1994 [DE] Germany ............................ 44 09 252.0

[51] Int. Cl.⁶ ................................ F16F 9/04; F16F 9/342
[52] U.S. Cl. ................................ 267/64.21; 267/64.22
[58] Field of Search .................... 267/64.18, 64.21,
267/64.22, 64.24, 64.28; 188/298, 299,
318, 319, 322.13, 322.21; 280/708, 711

[56] References Cited

U.S. PATENT DOCUMENTS

| | | | |
|---|---|---|---|
| 3,000,624 | 9/1961 | Cislo | 267/64.21 |
| 4,257,580 | 3/1981 | Schnitzius | 267/64.28 |
| 4,325,541 | 4/1982 | Kovosladanyi et al. | 267/64.21 |
| 4,666,135 | 5/1987 | Buma et al. | 267/64.21 |
| 4,768,758 | 9/1988 | Buma | 267/35 |
| 4,771,994 | 9/1988 | Makita | 267/64.21 |
| 4,886,251 | 12/1989 | Haussermann | 267/64.28 |

FOREIGN PATENT DOCUMENTS

| | | |
|---|---|---|
| 3347435 | 7/1985 | Germany. |
| 3427902 | 2/1986 | Germany. |

*Primary Examiner*—Robert J. Oberleitner
*Assistant Examiner*—Chris Schwartz
*Attorney, Agent, or Firm*—Nils H. Ljungman and Associates

[57] ABSTRACT

A self-actuating vibration damper for use in a pneumatic suspension system of a motor vehicle having an air spring that defines an air chamber is disclosed. Located within the air chamber is an actuator rod mounted between two air valves. Upon application of a sufficiently heavy load to the vibration damper, a first end of the actuator rod closes the first air valve to prevent release of air from the air chamber to the outside atmosphere, and a second end of the actuator rod opens the second valve to admit compressed air into the air chamber.

20 Claims, 12 Drawing Sheets

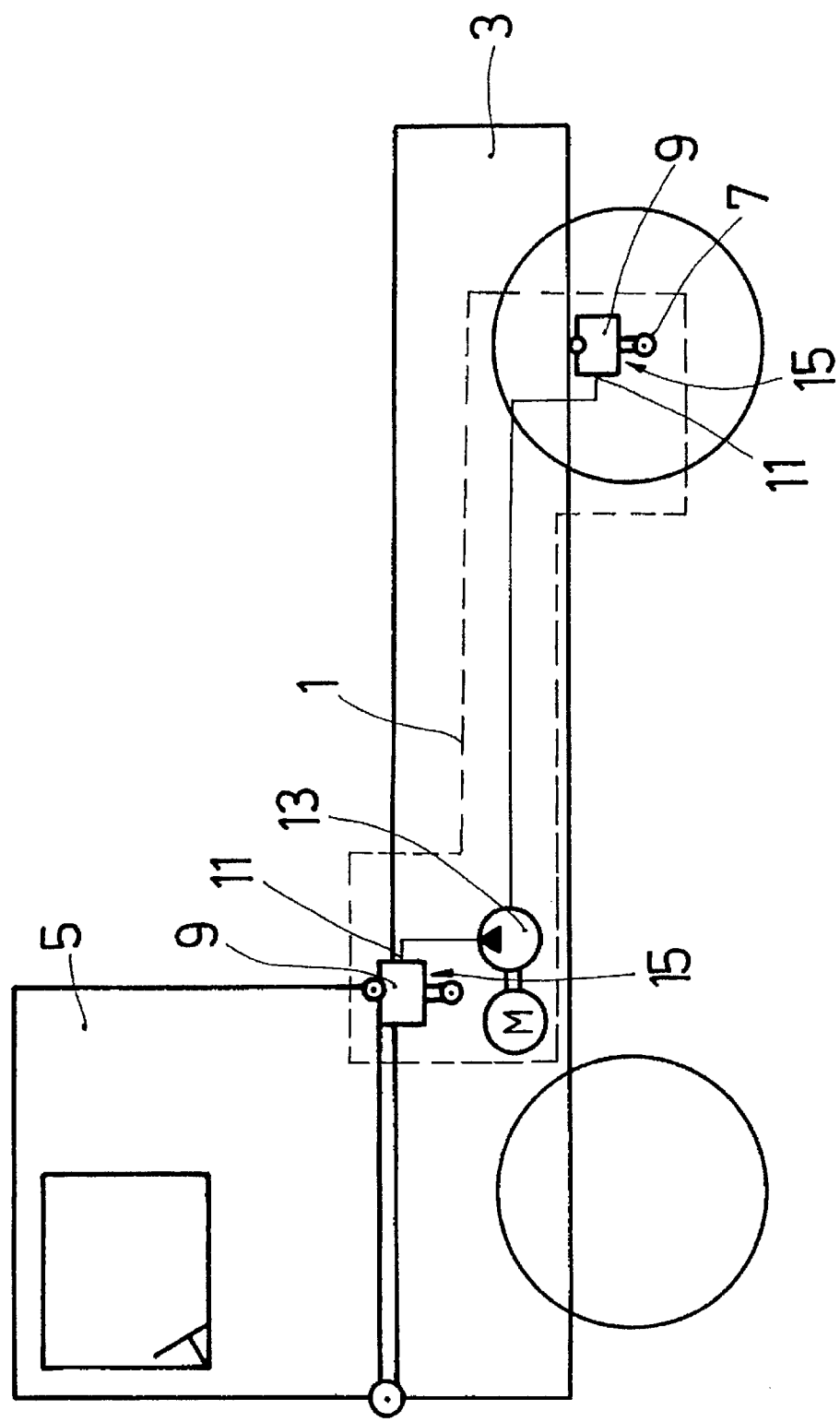

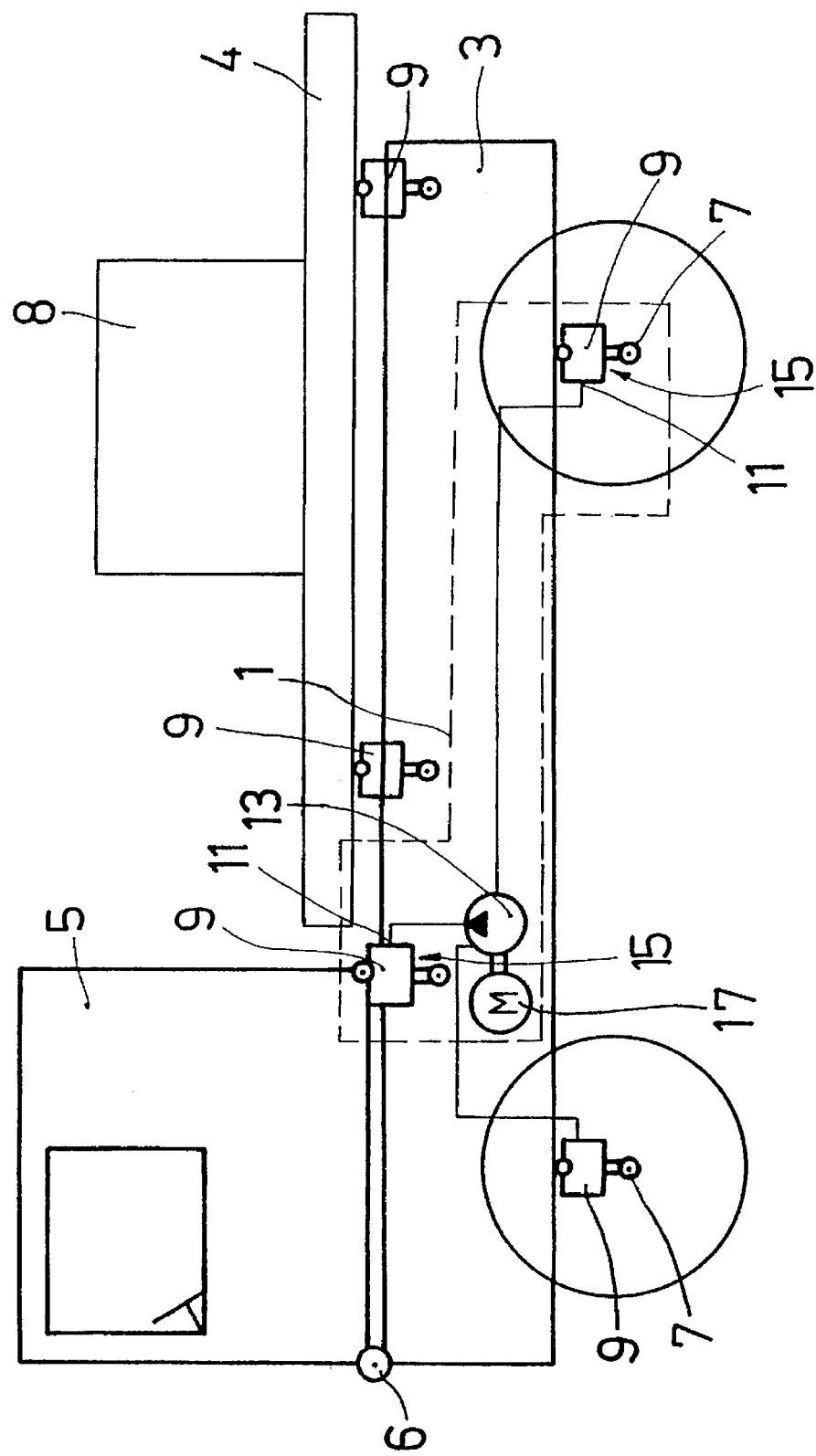

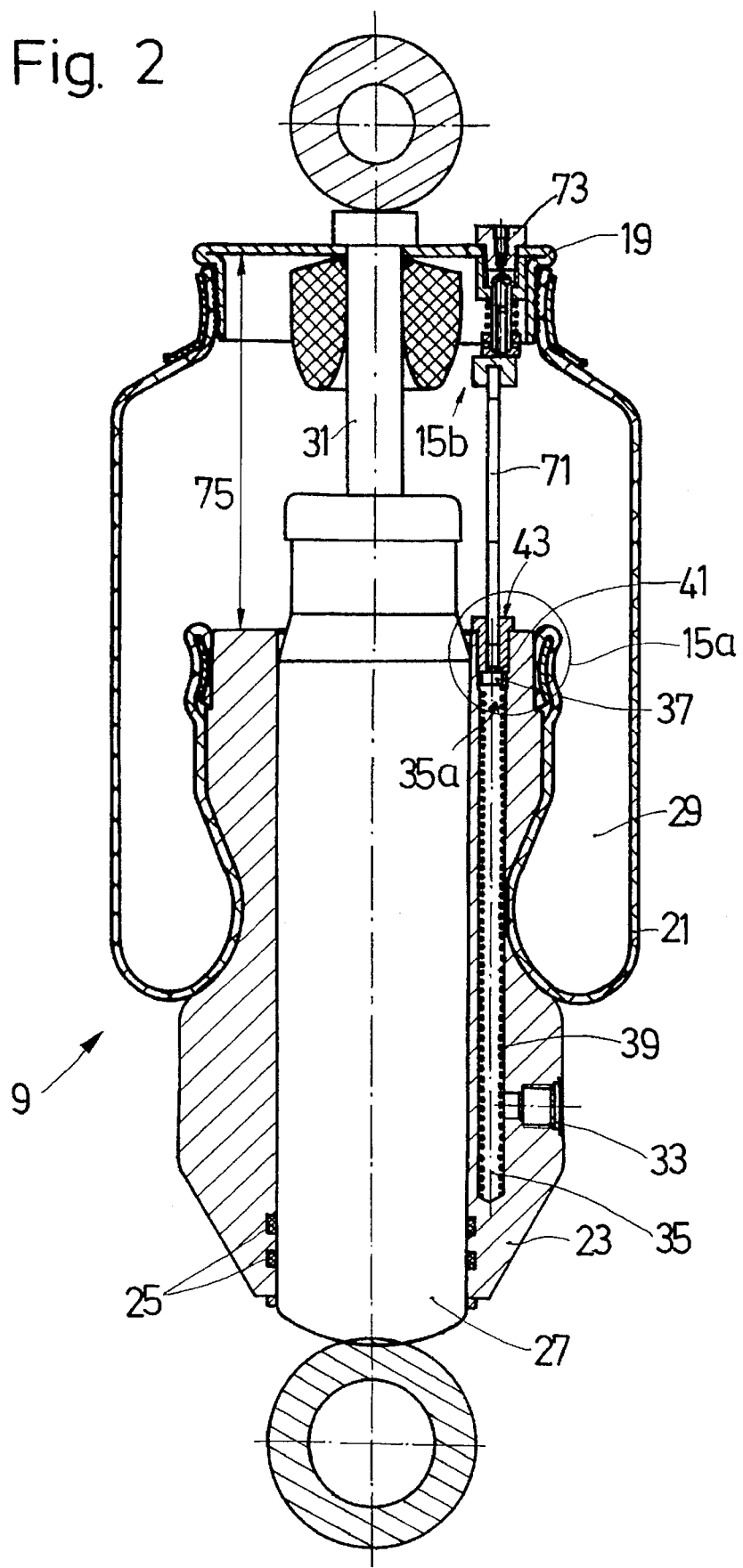

B-B

C-C

D-D

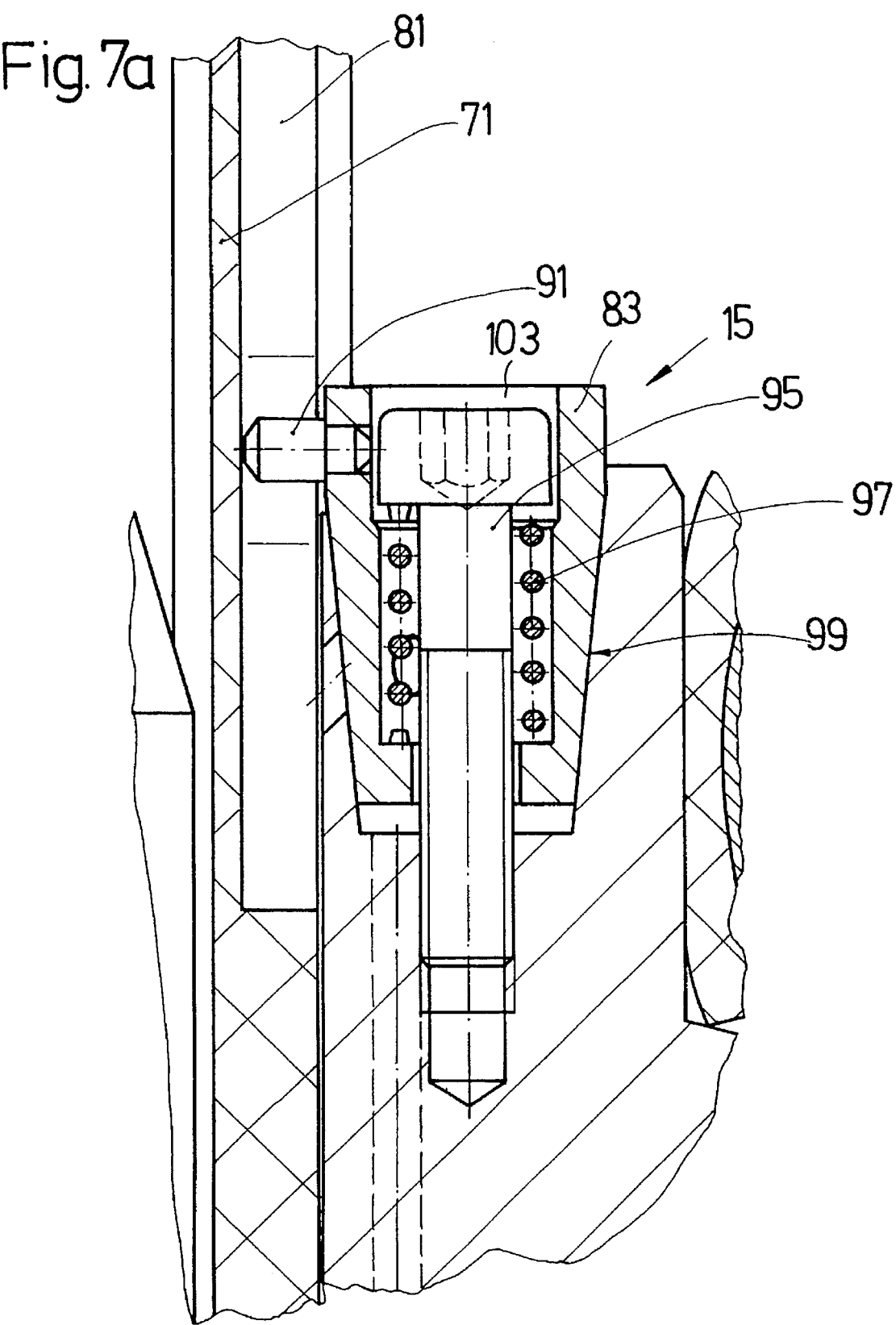

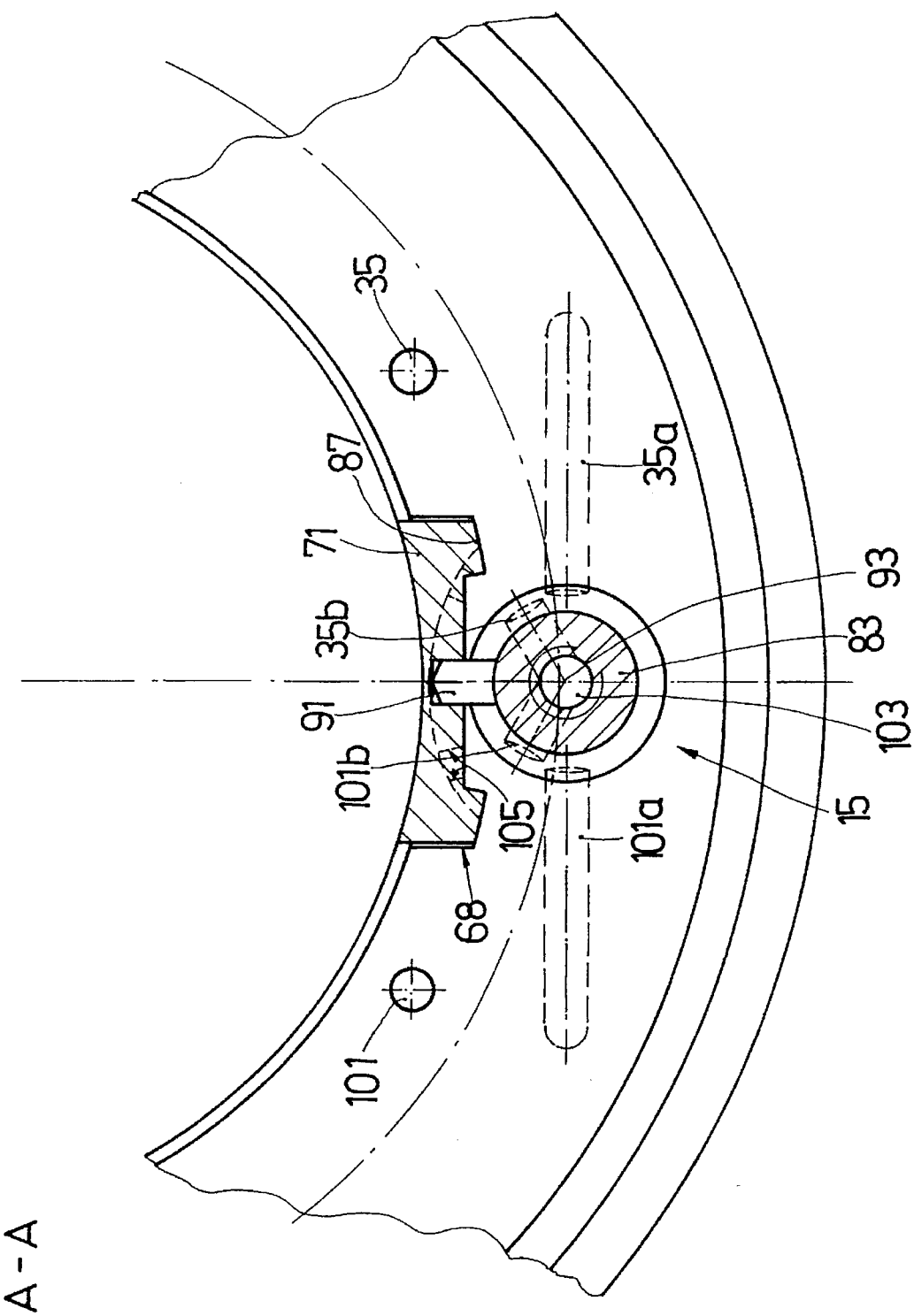

A-A

VIBRATION DAMPER AND PNEUMATIC SUSPENSION SYSTEM

BACKGROUND OF THE INVENTION

1. Field of the Invention

This invention generally relates to a vibration damper which has a pneumatic spring component, and a pneumatic suspension system which utilizes such a vibration damper. A pneumatic suspension system can have a number of pneumatic springs between a vehicle frame and at least one vehicle component mounted so that it oscillates in relation to the vehicle frame. This component could be a wheel or a passenger cab, etc. Such pneumatic springs can typically be operated via a control valve for the admission and discharge of compressed air into and out of the pneumatic springs, whereby the control valve can be actuated by means of an actuator.

2. Background Information

A pneumatic suspension system of the type described above is disclosed in German Laid Open Patent Application No. 33 47 435. However, a fundamental problem of this system involves the installation and adjustment of the control valve or the actuator, to set a defined switching position of the control valve as a function of a load condition or of a stroke position of the air spring. Additional space and installation accessories such as brackets, rods, screws etc. are generally necessary for the installation of the externally-mounted level control valve.

In known dampers, during the assembly process, the oscillating vehicle component is usually brought into a defined position relative to the vehicle frame, and the actuator is adjusted or calibrated with the oscillating component held in this fixed position. It can be quite difficult to incorporate this adjustment operation into an assembly line manufacturing process.

Moreover, during operation of a vehicle with a pneumatic suspension system in difficult terrain, dirt and moisture can adversely affect the functioning of the externally-mounted level control valve, and thus of the vehicle itself.

OBJECT OF THE INVENTION

The object of the present invention is therefore to improve a pneumatic suspension system so that the assembly and adjustment processes can be simplified, so that the operational performance can still be provided, even under difficult conditions, and so that the expense and effort required to design and manufacture the system can be at least reduced.

SUMMARY OF THE INVENTION

The present invention teaches that this object can be achieved if there is an actuator for the control valve of at least one air spring. During the assembly of the air spring, the actuator can preferably be applied simultaneously to the air spring. In addition, the connection between the actuator and the air spring can also essentially be made very precisely with little expense or effort, so that during the assembly of the air spring on the vehicle, no additional adjustment work would typically be necessary. The present invention also teaches that the actuator can be located inside the air spring. The actuator can thereby be protected against dirt, dust, moisture and unauthorized access.

In at least one of the embodiments of the present invention, the actuator can preferably be fastened to two components of the air spring, which components can move in relation to one another, whereby the actuator is formed by at least one semi-rigid control rod. It musk thereby essentially be guaranteed that the control rod exert the required actuation force of the control valve over the entire actuation range. In the design of the air spring, a specified component length can be specified as a reference. At this specified component length, the control valve should essentially be in the closed position. With a knowledge of the stroke position between the two air spring components which are movable in relation to one another, the control rod can be designed so that no adjustment would be necessary.

The present invention also teaches that the actuator can be fastened in different positions relative to the fastening point. Alternatively, the effective length of the actuator can be made changeable, or variable. The adjustment should therefore essentially need to be made only once for a vehicle series, and not individually for each vehicle.

In another embodiment of the present invention, the air spring can preferably have a minimum pressure valve which is independent of the actuator. The air spring can thereby be protected from a situation in which the minimum pressure is not present, which thereby protects the air spring against self-destruction. The air consumption can thereby also be reduced.

The present invention also teaches that the control valve can be a component of the air spring, and thus, located within the air spring. The control valve can thereby also be protected against environmental influences, and essentially does not require any connection to any component located outside the air spring.

In one alternative variant of the present invention, the control valve can essentially be formed by two individual valves, one of which can control the admission of the compressed air into the air spring, and the other of which can control the discharge of the compressed air out of the air spring. The two control valves can thereby preferably be actuated by means of an actuator mounted in a floating manner in the form of a control rod. This mechanical coupling has the advantage that the one valve can essentially always be closed when the other valve is open.

To prevent oscillations of the control circuit of the control valve which might occur in the event of a digital switching of the passage cross section, and which are reflected by a frequent switching of the control valve, the control valve can preferably have an admission characteristic which can be varied between a minimum and a maximum passage cross section, as a function of the stroke position of the air spring.

To simplify the construction of the valve, the present invention teaches that at least a portion of the control rod can be a component of one of the two valves. It can also essentially be appropriate to have the control valve located inside a turret of the air spring. The turret thereby assumes the function of the housing for the control valve. The turret can also form the connecting line for at least one direction of air flow of the control valve. In general, the turret can comprise a casing disposed about the shock absorber, wherein the exterior of the casing is configured to provide a roll-off surface for the bellows of the air spring.

The present invention also teaches that one of the valves of the control valve preferably be formed by an axially movable valve bolt which can preferably be moved into a closed position by the control rod against a spring force. The control rod with its cross section surface in a valve sleeve, can advantageously form one of the control valves. This combination of the functions of the control rod can significantly simplify the overall construction of the control valve.

To realize the admission characteristic of the control valve, the control rod can preferably have several cross section surfaces of different sizes. Depending on the cross section size, the flow through the valve can essentially be modified so that, in relation to a change in the stroke position, there can be a graduated or continuous opening action, and not merely an open/shut switching action. The invention also teaches that the valve bolt can preferably have a second valve which partly closes the flow of compressed air through the control valve before the valve bolt reaches its maximum closed position. This design of the control valve is also intended to protect the control circuit from overshooting.

The second valve of the control valve can thereby be formed by a spring-loaded tappet which controls a central channel. The central channel can be formed by an axial hole which, in the vicinity of the limit stroke of the tappet, has radial channels, whereby the tappet in the maximum open position is outside the path of a radial channel which feeds into the central channel. This simple valve construction essentially requires only a very small amount of space.

In one alternative version, the control valve can be designed as a rotary disc valve which can essentially be actuated by means of a guide track. This guide track can essentially be formed between the control rod and a rotary disc valve body. To prevent frictional forces which could result in a sticking of the rotary disc valve, the guide track is designed, and oriented centrally in relation to the center of rotation of the rotary disc valve body.

In one embodiment, the guide track can be formed by a crank which corresponds to the actuator or the control rod, in which track a transmission pin of the valve disc can be engaged. The shape of the guide track can thereby determine the opening and closing action of the control valve. This guide track can be manufactured very precisely with available manufacturing methods. Alternatively, the guide track can be formed by a rod body which corresponds to the actuator, whereby the rod body can be at least partly enclosed by a transmission groove of the rotary disc valve body. This variant embodiment essentially requires fewer manufacturing measures to produce the guide track. To prevent switching actions of the control valve caused by a relative rotational movement inside the air spring when the vehicle components oscillate, the actuator can preferably be non-rotationally fastened at a defined reference point of the control valve, e.g. between the external tube and the turret.

One aspect of the invention resides broadly in a pneumatic spring and shock absorber assembly, such as for a motor vehicle, the assembly comprising: a shock absorber defining a longitudinal axis and an axial direction parallel to the longitudinal axis, the shock absorber comprising: at least a first cylinder, the at least a first cylinder defining a chamber therein, the chamber comprising damping medium therein, and the at least a first cylinder having a first end portion, a second end portion opposite the first end portion and a length between the first and second end portions; a piston rod projecting into the at least a first cylinder through the first end portion of the cylinder, the piston rod having a first end portion within the at least one cylinder and a second end portion opposite to the first end portion and extending out of the at least one cylinder, the first end portion comprising a first axial end of the piston rod, the second end portion comprising a second axial end of the piston rod, and the piston rod being axially displaceable with respect to the at least a first cylinder in the axial direction; piston apparatus disposed adjacent the first axial end of the piston rod for dividing the chamber into first and second chamber portions; and apparatus for permitting flow of damping medium between the first and second chamber portions; a pneumatic spring for applying a substantially axially directed force between the piston rod and the at least a first cylinder, the pneumatic spring comprising bellows apparatus disposed about the second end portion of the piston rod for containing air under pressure, the bellows apparatus comprising a first end fixedly disposed at the second end of the piston rod, and a second end fixedly disposed at the first end portion of the at least one cylinder; valve apparatus for admitting air under pressure into the bellows apparatus and for permitting air to escape out of the bellows apparatus; and the pneumatic spring further comprising actuator apparatus for operating the valve apparatus to open and close the valve apparatus to permit air into and permit air to escape from the bellow apparatus.

BRIEF DESCRIPTION OF THE DRAWINGS

The present invention is explained in greater detail below with reference to the embodiments illustrated in the accompanying drawings, in which:

FIG. 1 is an overall illustration of a pneumatic suspension system;

FIG. 1a shows an additional illustration of a pneumatic suspension system;

FIG. 2 is a section through an air spring with a divided control valve;

FIGS. 6b–6d show various cross section of the control rod taken along views B—B, C—C and D—D, respectively of FIG. 6a; and FIGS. 7a–c are detailed illustrations of the control valve shown as a rotary disc.

DESCRIPTION OF THE PREFERRED EMBODIMENTS

Figure 2A:
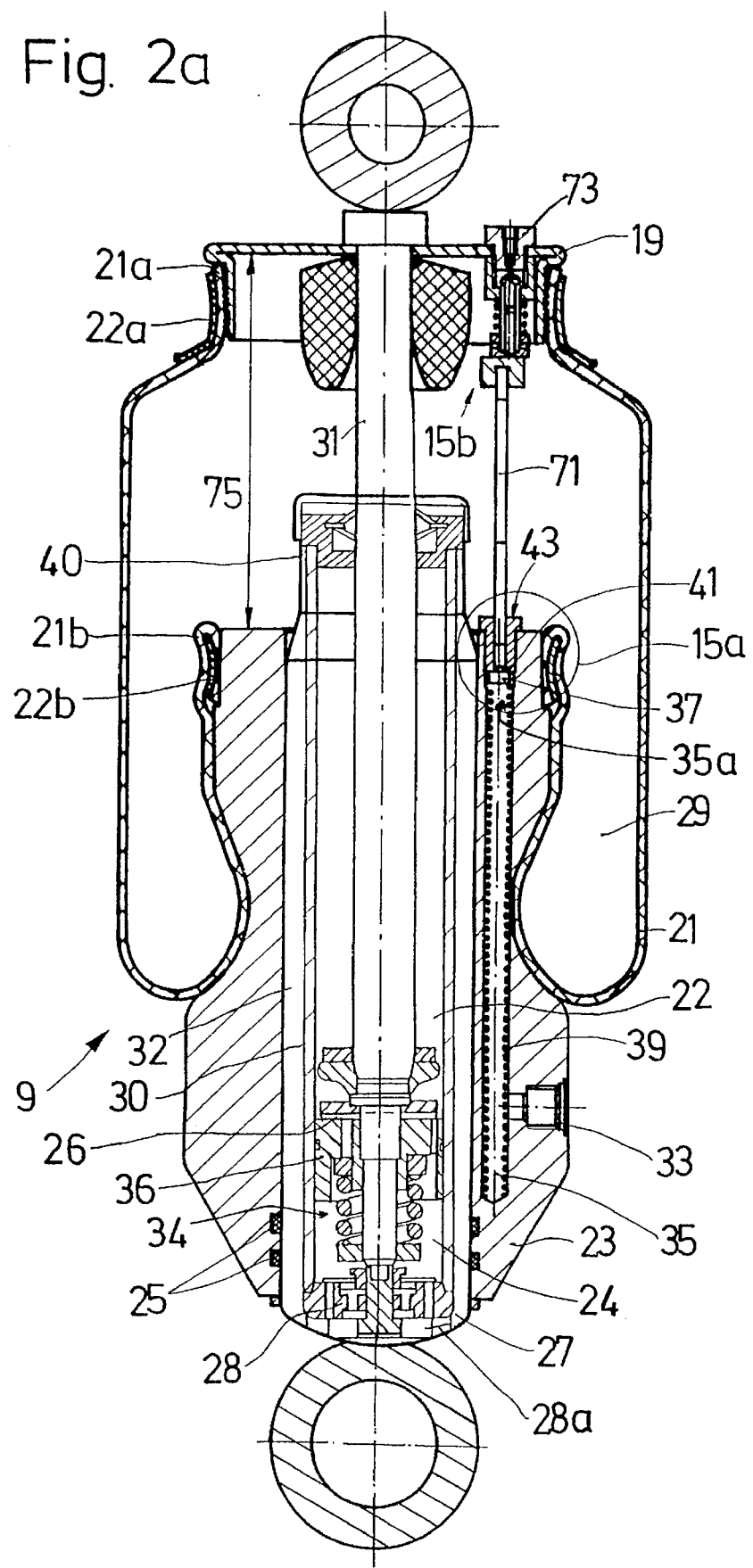
FIG. 2a shows a similar view to that of FIG. 2, but includes additional components.

FIG. 1 shows an installation for a pneumatic suspension system 1. Such a suspension system 1 can preferably be disposed between a vehicle frame 3 and a vehicle component mounted so that it can vibrate relative to the vehicle frame 3, e.g., a passenger compartment 5 or a vehicle axle 7. At least one air spring 9 can be provided between the frame 3 and the compartment 5 or axle 7. The air spring 9 can preferably be connected by means of a supply connection 11 to a pressure source 13, whereby a control valve 15 can be interposed as part of the air spring 9. The compressed air for the system can preferably be supplied by means of a compressor unit 17, which could possibly be disposed as shown in FIG. 1a.

FIG. 1a also shows that air springs 9 could be used at additional locations in a motor vehicle. As shown, a cargo bed 4 could also preferably be mounted to the frame by means of such a suspension system. Such a cargo bed 4 mounting might be required for the transport of very fragile or sensitive cargo 8, which might include electronic equipment, etc. The passenger compartment 5 could also be mounted to the frame via a bushing 6 at the front portion thereof. This bushing 6 could, in essence, serve as a hinge-type member about which the compartment would pivot during vibrations at the rear end where the air spring 9 is disposed.

FIGS. 2 and 2a show one possible embodiment of an air spring 9 in accordance with the present invention. This air spring 9 has an outer tube 19, a spring bellows 21, and a turret, or roll-off tube 23. A first end 21a of the spring bellows can preferably be fastened to the outer tube 19 by means of clamping ring or belt-type tensioning element 22a, which clamping ring 22a can fit tightly about, and hold the first end 21a tightly to the outer tube 19. A second end 21b of the spring bellows can preferably be connected in a similar manner, by means of a clamping ring or belt type tensioning element 22b to the turret tube 23. The bellows 21 can preferably be attached with prestress to the turret tube 23. In addition, the turret tube 23 can preferably be disposed about, and sealed with respect to a container tube 27 by means of seals 25. In this manner, a spring chamber 29, under pressure, can be defined by the spring bellows 21, the turret tube 23 and the outer tube 19.

A piston rod 31, together with the container tube 27 can be components of a vibration damper unit shown in more detail in FIG. 2a. within the container tube 27 there could possibly be an additional tube 30, so that an equalization chamber 32 can be formed between the tube 30 and the tube 27. The piston rod 31 can preferably move axially within the tube 30. At the end 34 of the piston rod 31, which end 34 is disposed within the tube 27, there can preferably be a piston unit 36. The piston unit 36 preferably divides the interior of the tube 30 into two chamber portions 22 and 24. The piston unit 36 can also include a valve member 26 for damping flow of fluid between the two chamber portions 22 and 24. In addition, at the bottom of the tube 27, there can preferably be a base valve 28, which base valve 28 can provide fluid communication between the chamber 24 and the equalization chamber 32 via a flow passage 28a. The base valve can be supported directly on the bottom of the container tube 27. At the top of the tubes 27 and 30 there can preferably be a piston rod guiding and sealing member 40 for sealing about the piston rod 31 and between the tubes 27 and 30. This sealing member 40 can essentially be configured to maintain a damping fluid within the interior of the vibration damper within the chamber portions 22 and 24.

The piston rod 31 can preferably be actively connected to the outer tube 19. Inside the turret tube 23 there can be a supply connection 33 which makes a transition into a compressed air admission line 35 for providing compressed air to a control valve part 15a. The compressed air admission line 35 thereby empties into the spring chamber 29. At the outlet 35a of the compressed air admission line 35 into the spring chamber 29, the one part 15a of the control valve 15 can preferably be located. This control valve part 15a preferably controls the compressed air admission into the spring chamber 29. The compressed air admission valve 15a can preferably be configured with a valve head 37, which valve head 37 can be pressed by a closing spring 39 against a closing valve seat 41. The closing valve seat 41 can be formed as a component of a valve sleeve 43. For compressed air discharge out of the spring chamber 29, there can preferably be an additional part of the control valve 15 in the form of a separate compressed air discharge valve 15b on the outer tube 19.

Figure 3:
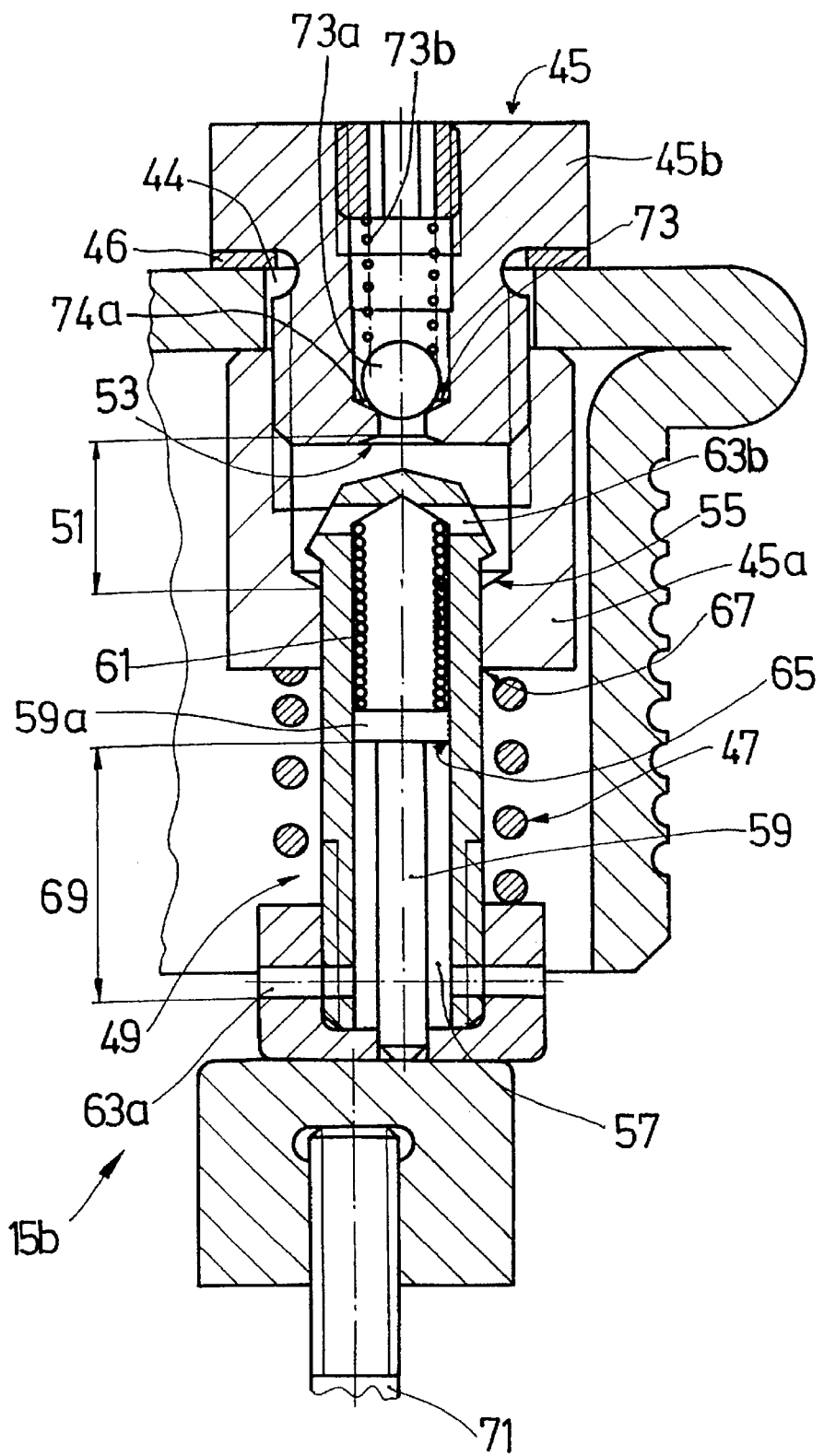
FIG. 3 shows a discharge valve in detail.

FIG. 3, the view Z of FIG. 2, shows the pressure discharge valve 15b in detail. The discharge valve 15b can preferably be formed by a two-piece fastening sleeve 45 having the parts 45a and 45b. The two parts 45a and 45b can preferably be threaded together through an opening 44 in the outer tube 19, wherein the part 45b can be inserted from the outside of the tube 19, and the part 45a can be threaded onto the part 45b from the inside of the tube 19. An additional sealing member 46 could also preferably be provided between the outer part 45b and the tube 19.

Inside the fastening sleeve 45, there can preferably be a valve body 49, which valve body 49 can be prestressed by a first opening spring 47. The valve body 49 can preferably be movable within the sleeve 45 over a displacement distance 51. The displacement distance 51 can be limited, on the one hand, by a valve closing surface 53 and, on the other hand, by a retaining surface 55. Inside a central channel 57 of the valve body 49, there can preferably be an axially movable tappet 59 with a tappet head portion 59a. The tappet 59 can be pressurized by a second opening spring 61 acting on the head portion 59a. In addition, within the valve body 49, there can also preferably be radial channels 63a, 63b in the vicinity of the ends of the central channel 57.

FIG. 2 shows the air spring 9 in a load state in which the compressed air admission valve 15a is in a closed position, and the pressure discharge valve 15b is in an open position, as shown in detail in FIG. 3. The open position of the pressure discharge valve 15b results from a ring-shaped gap 65 between the tappet head 59a and the central channel 57, and a guide gap 67 between the valve bolt 49 and the fastening sleeve 45. The sum of the cross sections of the gaps 65 and 67 essentially determines the first opening cross section. The first opening cross section is essentially active over both: a stroke length 69 which results from the maximum displacement distance of the tappet 59 between the radial channels 63a and the minimum compressed length of the second opening spring 61; and the displacement distance 51 of the valve bolt 49 between the retaining surface 55 end the valve closing surface 53.

The air spring 9 can preferably be set to a preset, or base level as essentially defined by a distance 75 (see FIG. 2) between the outer tube 19 and the turret tube 23. Such a preset, or base level could preferably correspond to what could be considered to be a first load, preferably at rest, applied to the air spring 9. To provide this preset, or base level within the spring chamber 29, an actuator 71, as shown in FIG. 2 and in detail in FIG. 4, can preferably be provided to control the two valves 15a, 15b. In essence, the actuator 71 can preferably be mounted in an axially floating manner between the two valves 15a and 15b, and can be in contact, on the one hand, with the valve body 49, and, on the other hand, with the closing spring seat 41, whereby the valve head 37 can be a component of the actuator 71. The actuator can thereby essentially function as a "control rod" as set forth below. In essence, the length of the actuator 71 can determine the distance 75, as discussed further herebelow.

Figure 5:
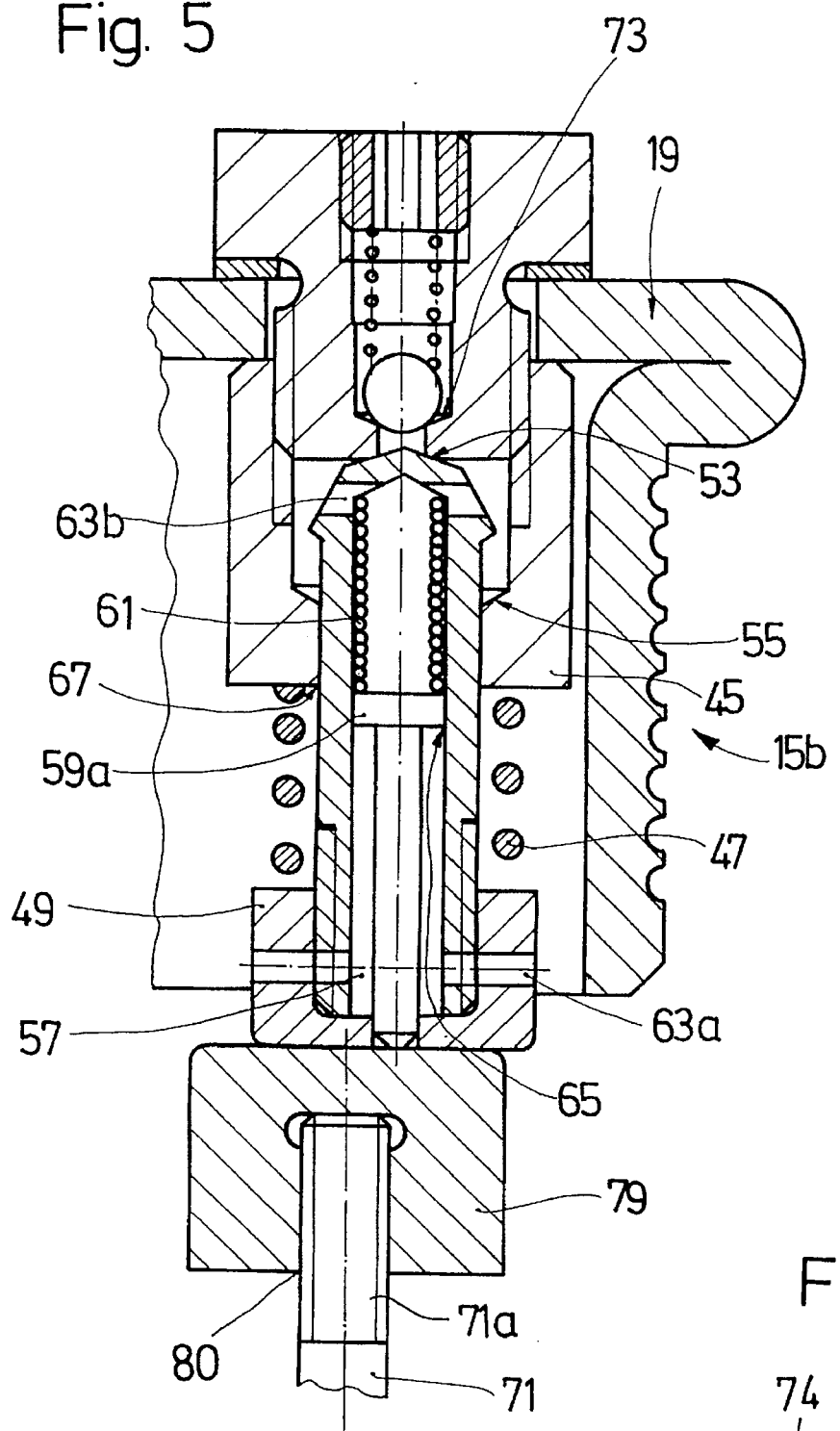
FIG. 5 shows a discharge valve in the maximum closed position.

Starting from this preset, or base load condition, when an increased load is applied to the air spring 9, a distance 75, shown in FIG. 2, wall essentially decrease, and the valve body 49 will essentially move towards the valve closing surface 53 against the force of the first opening spring 47. Under a sufficient load, the valve body 49 will make contact, still against the force of the first opening spring 47, with the valve closing surface 53, as shown in FIG. 5. In this valve position of FIG. 5, a connection between the spring chamber 29 and the atmosphere is effectively prevented, so that air from within the chamber can no longer leave via a minimum pressure valve 73. This valve 73 can essentially comprise a closing body 73a, such as a sphere, and a biasing member, or spring 73b to bias the closing member into contact with a valve seat 74a.

To this point, where the valve body 49 contacts the surface 53, since the sum of the forces of the first and second opening springs 47, 61 is preferably less than the spring force of the closing spring 39, the compressed air admission valve 15a essentially would remain closed. When there is a further reduction of the distance 75 between the outer tube 19 and the turret tube 23, i.e., under an even larger load, the valve body 49 would be indirectly supported by means of the valve closing surface 53 on the outer tube 19, and essentially the only possible remaining movement would be for the actuator 71 to move downwardly into the passage 35, thereby effecting an opening of the compressed air admission valve 15a.

By means of the compressed air admission line 35, the resultant opening of the valve 15a, permits compressed air to flow into the spring chamber 29, to counter the increased load put upon the air spring 9. This compressed air flow into the spring chamber 29 thereby moves the outer tube 19 away from the turret tube 23 to increase the distance 75. As such, when the preset or base level is again re-established, the compressed air admission valve 15a would close under the action of the spring 39.

Figure 4:
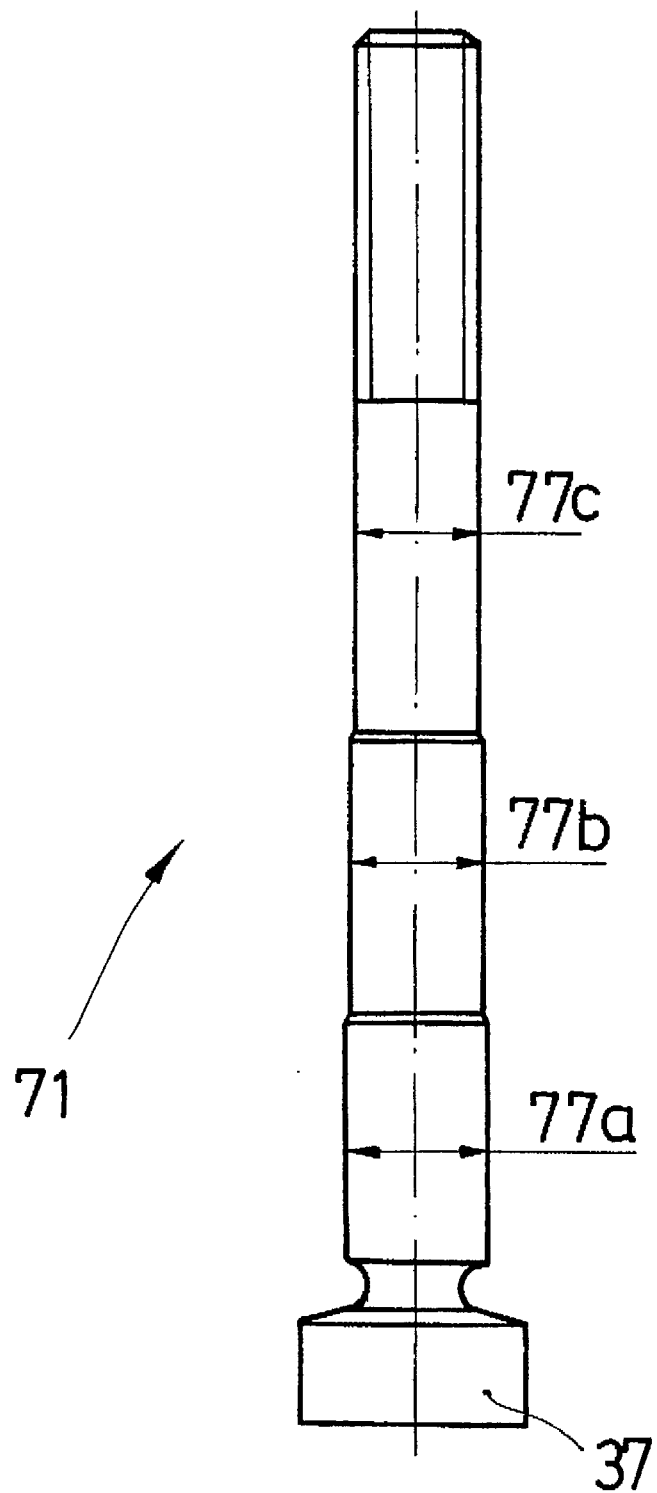
FIG. 4 shows a control rod in detail.

As shown in FIG. 4, the control rod 71 has areas 77a, 77b and 77c of different diameters. The difference between the cross sections of these areas 77a–77c, together with the cross section, of the valve sleeve 43, essentially determine the respective flow cross section for compressed air flowing into the spring chamber 29 from the passage 35. As shown in FIG. 4, the cross section of the control rod 71 decreases, preferably in steps, from area 77a to area 77c. The graduation produces a graduated flow cross section, which prevents overshooting, in particular a fluttering action of the control valve 15a during rapidly changing vibration conditions.

Again starting from the preset level, wherein the valve body 49 is still in contact with the valve closing surface 53 (see FIG. 5), the valve 15a is also closed. As the load is reduced further, the outer tube 19 moves away from the turret tube 23, so that the distance 75 between the valve body 49 and the turret tube 23 also increases (See FIG. 2). This increased distance 75 can then be compensated by the first opening spring 47 which would then move the valve body 49 in an axial direction toward the turret tube 23, that is, until the valve body 49 is in contact with the retaining surface 55 of the fastening sleeve 45. As such, the valve body 49 thereby lifts up from the valve closing surface 53, providing access of the compressed air within the chamber 29 to the valve 73. Further, the ring-shaped gap 65 and the guide gap 67 again become active as the opening cross sections (See FIG. 3) for the passage of compressed air towards the valve 73. The compressed air can then escape through the opening cross section by means of the minimum pressure valve 73 in opposition to the closing force provided by the spring 73b.

If the load is decreased even lower, since the valve bolt can essentially no longer move further away from the sleeve 45, the control rod 71 essentially lifts up from, or moves away from the valve bolt 49. This movement of the control rod 71 away from the valve bolt 49 thereby enables, to the same extent, the tappet 59 to be moved axially by the spring force of the second opening spring 61 toward the radial channels 63a. Thus, under a sufficiently decreased load, the tappet will move out of the sleeve 45 until the head, or flange 59a of the tappet 59 comes into contact with the valve piston 49. In essence, this valve piston member 49 closes off the bottom of the fastenting sleeve 45. When such contact occurs between the flange 59a and the member 49, the compressed air from the spring chamber 29 can then escape through the cross sections of the radial channels 63a into the total open central channel 57 and then by means of the radial channels 63b and the minimum pressure valve 73 into the atmosphere. The discharge valve 15b also experiences a smoother switching action on account of the two-stage nature of the opening cross sections.

The escape of the compressed air from the spring chamber 29 under decreased loads thereby permits the outer tube 19 to then move back towards the turret 23 to decrease the distance 75, and compensate for the decreased load.

Figure 5A:
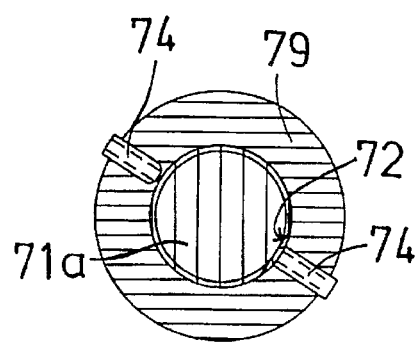
FIG. 5a shows a cross section of the control rod taken in the vicinity of the contact head thereof.

For an adjustment to the preset level, the air spring can be adjusted by means of the control rod 71. This can essentially be accomplished by changing the effective length of the control rod 71. For this purpose, the control rod 71 can preferably be provided with a contact head 79, disposed on the control rod 71 preferably by means of a threaded connection 80 (FIG. 5). Thus, by turning the contact head relative to the control rod 71, an axial adjustment of the overall length of the control rod 71 can be performed. Such an adjustment can preferably be done before the spring bellows 21 is fastened to the outer tube 23. As shown in FIG. 5a, it might be desirable that a locking connection be provided for retaining the contact head 79 in a fixed position on the control rod 71, as a threaded connection might turn over a period of time. For this purpose, the end 71a of the control rod 71 could be provided with a flattened portion 72. At least one screw 74 (two of which are shown) could then be threaded through the contact head 79 to engage the flattened portion 72 of the end 71a and thereby prevent relative rotation between the contact head 79 and the control rod 71.

Figure 6:
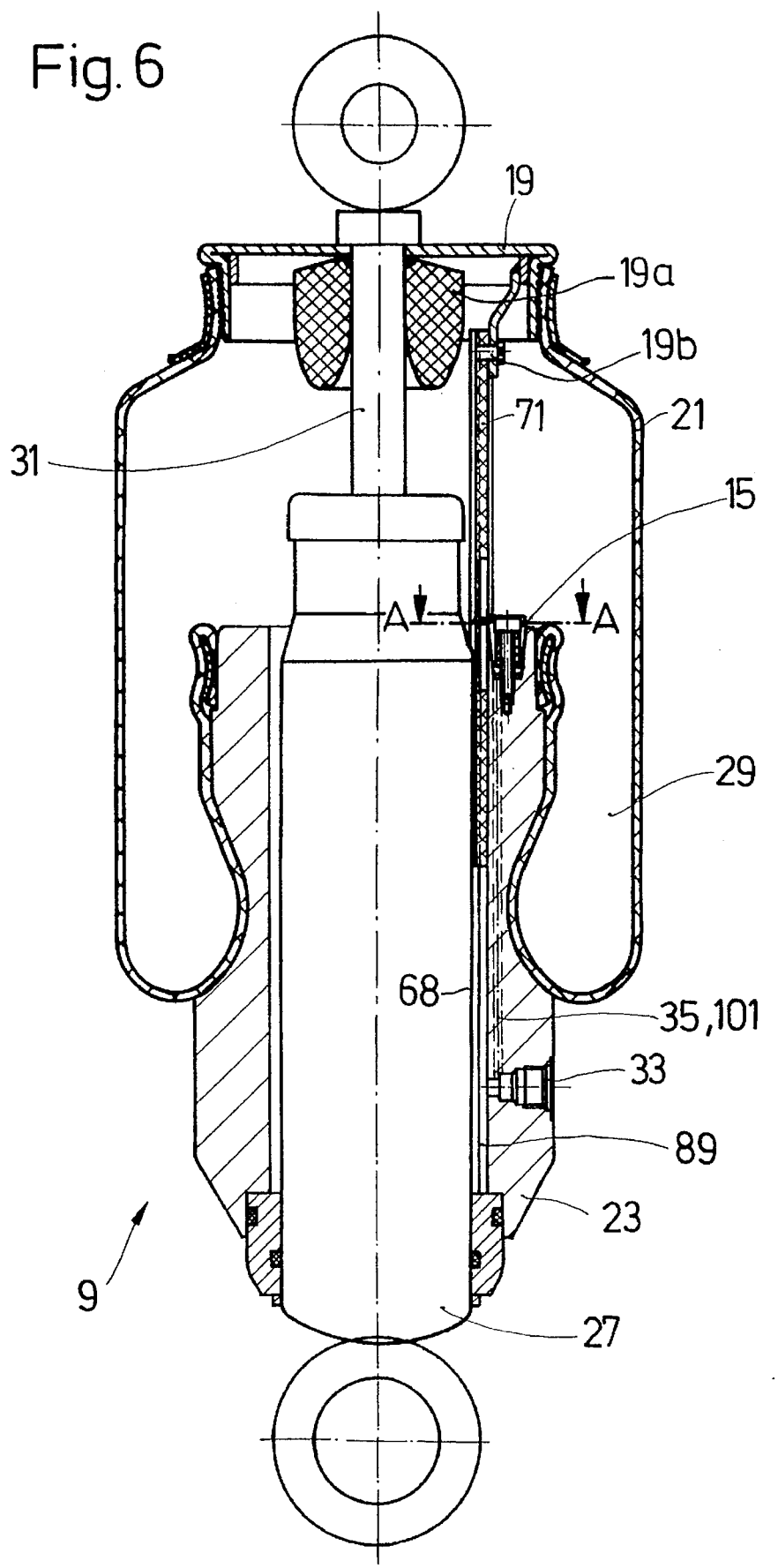
FIG. 6 is a section through an air spring with a rotary disc control valve.
Figure 6A:
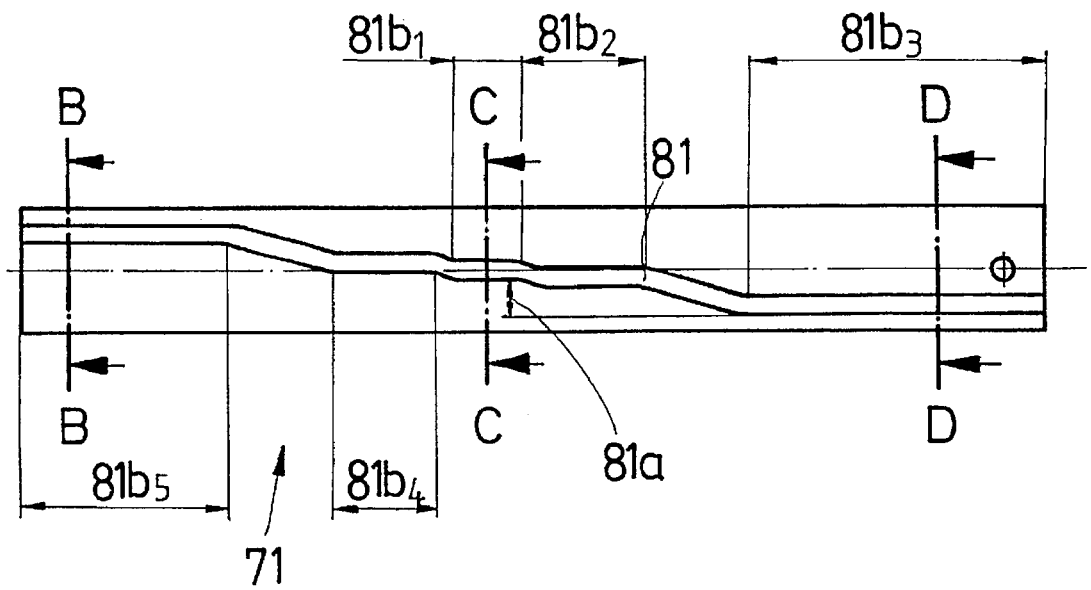
FIG. 6a shows the control rod in detail.

FIG. 6 shows a section through an alternative embodiment of an air spring 9, the basic design of which is essentially the same as the variant illustrated in FIG. 2 with the exception of the realization of the control valve 15 end the actuator 71. In this embodiment, the actuator 71 has a guide track 81 as shown in FIG. 6a. This guide track 81, in the circumferential, or width direction, starting from a reference point C—C of the guide track 81, can preferably be radially offset towards one side or the other along its axial length. This guide track 81 is essentially provided to interact with a rotary disc valve body 83, via a guide pin 91 as shown in FIG. 7a. Thus, when the guide track 81 executes a relative translation movement starting from position C—C, i.e., a movement along its axial length, a radial offset 81a of the guide track 81 can occur. This radial offset 81a, by means of an engagement of the rotary disc valve body 83 with the guide track 81 via pin 91, can lead to a rotational movement of the rotary disc valve body as the pin 91 follows the radial offset.

Figure 6B:
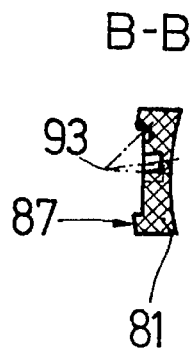
Figure 6C:
Figure 6D:
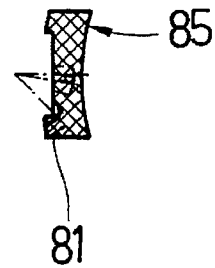

To provide for movement of the translational movement of the guide track 81, the actuator 71 can preferably be connected rigidly to the outer tube 19 in the longitudinal direction. Such a connection could preferably be provided, in at least one embodiment of the present invention, by means of a connecting flange 19a, preferably welded to the outer tube 9, and a rivet 19b connecting the actuator 71 to the flange 19a. As shown in FIG. 7b, the actuator 71 can preferably be disposed immediately adjacent the container tube 27 between the container tube 27 and the turret tube 23. For this purpose a slot 68 can preferably be provided in the interior of the turret tube 23. As such, as shown in FIGS. 6b–6d, the actuator 71 can also preferably be provided with a contour 85 which matches the contour of the container tube 27. For guiding the movement of the actuator 71, the actuator 71 can also preferably be provided with guide rails 87, which can be engaged in a corresponding matching contour 89 (FIG. 7b) of the turret tube 23, so that no relative rotational movements of the outer tube 19 can have an effect on the rotary disc valve body 83.

In this variant embodiment, the guide track 81 can essentially be realized by means of a sliding block, or link, inside the actuator, in which the transmission pin 91 of the rotary disc valve head 83 can be engaged as shown in FIG. 7a. The guide track 81 can thereby essentially be machined centrally with respect to the center of rotation 93 of the rotary disc valve body 83 so that the side walls 105 (FIG. 7b) of the guide track 81 are essentially parallel to a line drawn from the center of rotation 93 and bisecting the groove forming the guide track 81. This configuration of the guide track 81 can essentially guarantee a secure, or reliable, kinematic rotation, and can also essentially prevent any forces which might cause the valve to stick.

FIGS. 7a and 7b show the rotary disc valve body 83 engaged in the guide track 81 by means of pin 91. For receipt of the valve body 83 therein, the turret tube can preferably be provided with an externally conical bore 99. A retaining screw can preferably be provided to hold the valve body 83 in the conical bore 99, with play. To take up the play, and thereby provide a seal between the conical bore 99 and the valve body 83, a biasing member, or retaining spring 97 can preferably be provided to bias the valve body 83 into the bore 99. The special shape of the external surface of bore 99 essentially simplifies the seal.

The plan view shown in FIG. 7b shows the discharge and admission lines 101, 35, respectively, for the compressed air. The discharge and admission lines 101, 35 can respectively be connected, with the control valve 15 by means of corresponding connection stubs 101a, 35a, which stubs can be located at about 180 degrees from one another. The rotary disc valve body 83 preferably has two angularly-offset control channels 35b, 101b, preferably disposed at about 120 degrees with respect to one another, which control channels 35b and 101b can empty into a common connecting channel 103, which common connecting channel 103 is open to the spring chamber 29 (shown in FIG. 6).

In this embodiment, the present level can preferably correspond to the position of pin 91 being disposed essentially at the cross section C—C in FIG. 6a, wherein neither of passage 35 or 101 is connected to the channel 103 (FIG. 7b).

When there is a change in the load, starting from the load condition which corresponds to the preset level, in which the transmission pin 91 assumes the position C—C of the guide track 81 within a span $81b_1$, and both control channels 35b, 101b are not engaged with the stubs 35a, 101a, the actuator 71, by means of the outer tube 19, executes a movement relative to the transmission pin 91 of the control valve 83. The change in load can then cause, by means of the radial offset of the guide track 81, a rotational movement of the rotary disc valve body 83, so that the pin 91 enters either of spans $81b_4$ or $81b_2$ (increasing or decreasing loads respectively). In the spans $81b_4$ and $81b_2$, one of the control channels 101b, 35b, respectively, will preferably at least partly overlaps the corresponding stub 101a, 35a to thereby partially open the channels 101 or 35. When there is a further change in the load, a further rotational movement of the rotary disc valve body 83 will occur as the transmission pin 91 moves from across an additional radial offset from one of the spans $81b_4$ or $81b_2$ into a next adjoining span $81b_5$ or $81b_3$ respectively. This movement from one of the spans $81b_4$ or $81b_2$ into a next adjoining span $81b_5$ or $81b_3$ converts the opening of the stubs 101a, 35a into a maximum blow-by cross section of the rotary disc valve body 83.

With respect to the above discussion, if there is an increase in the load, the actuator 71 is moved downwardly into the turret tube 23, thereby causing the transmission pin 91 to depart from the location C—C in the guide track 81 towards the location of cross section D—D, which in the view of FIG. 7b, would cause the valve body 83 to turn clockwise, and thereby, by means of the stub 35a, open the compressed air admission line 35 to permit compressed air to flow into the spring chamber 29. Conversely, when there is a change in stroke in the direction of an extension of the piston rod 31 out of the tube 27, such as under a decreased load, the transmission pin 91 moves in the guide track 81 towards the location of the cross section B—B, the compressed air admission line 35 would thus be closed and the discharge line 101 would be opened, until the pin 91 is re-established in normal position of the guide track 81, or at the cross section C—C.

This variant embodiment also has means to prevent an overshooting of the control valve 15. As a result of the axial length of the respective guide segments $81b_1$–$81b_5$, inside each stroke length range, there can essentially be no further change in the blow-by, or opening, cross section than that which already occurred when the pin 91 moved from one section to another. Thus, the maximum offset 81a can be directly proportional to the blow-by cross section. The relatively low offsets in the stroke position range, or area around point C—C of the guide track 81, damps the control circuit.

The variant embodiments for the damping of the control circuit work by means of their graduation. As such, with a large variation in load, a desired stroke position adjustment can be achieved as quickly as possible by means of the larger opening cross section when the pin 91 is offset into regions $81b_3$ or $81b_5$. This quick adjustment is, of course, essentially only a rather approximate control action. Then, after a quick adjustment has been achieved with a maximum flow opening, to provide an approximate adjusting of the stroke position, the valve body 83 would be turned, via pin 91 entering region $81b_2$ or $81b_4$, so that a smaller flow opening cross section is then present for the compressed air, thereby allowing for a more precise adjustment of the positioning between the outer tube 19 and the turret tube 23. This more precise adjustment acts more slowly to achieve the exact setting of the stroke position. The overall air consumption by the air springs 9 during use thereof can thereby be reduced.

Of course, the graduation, in particular in the embodiment illustrated in FIG. 6a, could also be achieved continuously by means of a constantly sloped guide track, instead of steps. However, in such a case, the distinction between approximate and more precise control must also be maintained.

Figure 7C:
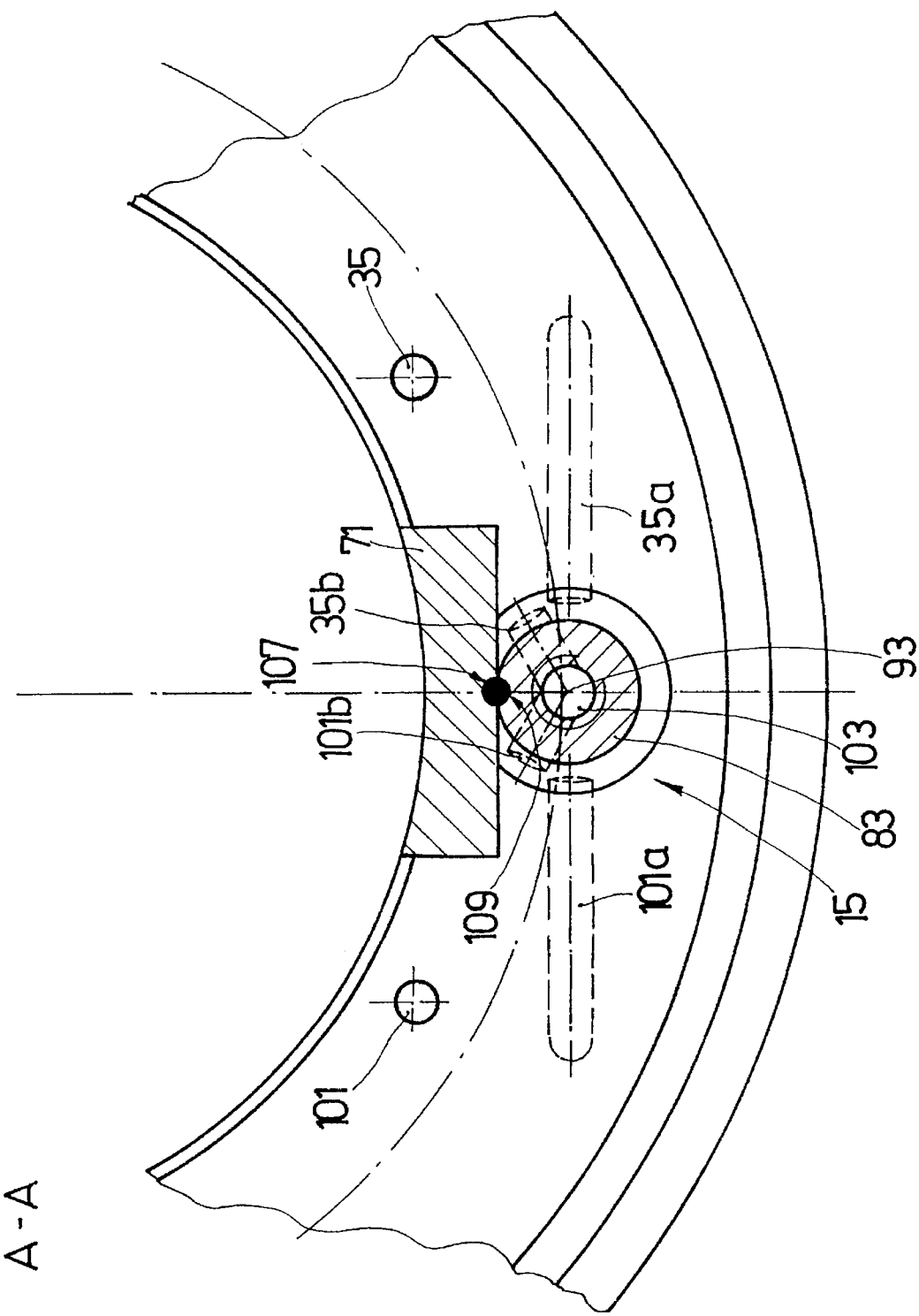

FIG. 7c illustrates a variant of the connection between the guide track 81 and the rotary disc valve body 83. In contrast to FIG. 7b, in which the guide track 81 is formed by a sliding block, and in which the guide contour itself within the sliding block is formed by the lateral surfaces 105 of the guide track 81 formed within the block, FIG. 7c uses a guide track 81 which is formed by a rod body 107, e.g. a solid bead or wire disposed on the actuator 71. A transmission groove 109 is then provided in the rotary disc valve body 83. This groove 109 preferably at least partly encloses and thereby spans the rod body 107, and essentially functions in the same manner as the embodiment of FIG. 7b.

One feature of the invention resides broadly in a pneumatic suspension system with a number of pneumatic springs between a vehicle frame and at least one vehicle component mounted so that it oscillates in relation to the vehicle frame, a control valve for the admission and discharge of compressed air inside the air springs, whereby the control valve is actuated by means of an actuator, characterized by the fact that there is at least one air spring 9 corresponding to the actuator 71.

Another feature of the invention resides broadly in the pneumatic suspension system characterized by the fact that the actuator 71 is located inside the air spring 9.

Yet another feature of the invention resides broadly in the pneumatic suspension system characterized by the fact that the actuator 71 is fastened to one of the air spring components 19, 23 which are movable relative to one another, and consists of an at least semi-rigid control rod.

Still another feature of the invention resides broadly in the pneumatic suspension system characterized by the fact that the fastening of the actuator 71 relative to the fastening point on the air spring 9 can be changed.

A further feature of the invention resides broadly in the pneumatic suspension system characterized by the fact that the actuator 71 is realized so that its effective length can be changed.

Another feature of the invention resides broadly in the pneumatic suspension system characterized by the fact that the air spring 9 has a minimum pressure valve 73 which operates independently of the actuator 71.

Yet another feature of the invention resides broadly in the pneumatic suspension system characterized by the fact that the control valve 15 is a component of the air spring 9.

Still another feature of the invention resides broadly in the pneumatic suspension system characterized by the fact that the control valve 15 consists of two individual valves 15a, 15b, one of which controls the admission of the compressed air, and the other of which controls the discharge of the compressed air.

A further feature of the invention resides broadly in the pneumatic suspension system characterized by the fact that the two control valves 15a, 15b are actuated by an actuator 71 mounted in a floating manner in the form of a control rod.

Another feature of the invention resides broadly in the pneumatic suspension system characterized by the fact that the control valve 15 has an admission characteristic which can be varied between a minimum and a maximum passage cross section, as a function of the stroke position of the air spring 9.

Yet another feature of the invention resides broadly in the pneumatic suspension system characterized by the fact that at least a part 37 of the control rod 71 is a component of one of the two valves 15a, 15b.

Still another feature of the invention resides broadly in the pneumatic suspension system characterized by the fact that the control valve 15 is located inside a turret, or payoff tube 23 of the air spring 9.

A further feature of the invention resides broadly in the pneumatic suspension system characterized by the fact that at least for one flow direction of the control valve 15, the turret 23 forms the connecting line 35.

Another feature of the invention resides broadly in the pneumatic suspension system characterized by the fact that one of the valves 15a, 15b consists of an axially movable valve bolt 49, which can be brought into a closed position by the control rod 71 against a spring force.

Yet another feature of the invention resides broadly in the pneumatic suspension system characterized by the fact that the control rod 71 with its cross sectional surface inside a valve sleeve 43 forms one of the control valves 15a, 15b.

Still another feature of the invention resides broadly in the pneumatic suspension system characterized by the fact that the control rod 71 has several cross section surfaces of different sizes.

A further feature of the invention resides broadly in the pneumatic suspension system characterized by the fact that the valve bolt 49 has a second valve, which partly closes the flow of compressed air through the control valve before the valve bolt 49 reaches its maximum closed position.

Another feature of the invention resides broadly in the pneumatic suspension system characterized by the fact that the second valve consists of a spring-loaded tappet 59 which controls a central channel 57.

Yet another feature of the invention resides broadly in the pneumatic suspension system characterized by the fact that the central channel 57 consists of an axial hole which, in the vicinity of the limit stroke of the tappet 59 has radial channels 63a/b, whereby the tappet 59 in the maximum opening position is outside the effective central channel 57.

Still another feature of the invention resides broadly in the pneumatic suspension system characterized by the fact that the control valve 15 is designed as a rotary disc valve which is actuated by means of a guide track 81 between the control rod 71 and a rotary disc valve body 83.

A further feature of the invention resides broadly in the pneumatic suspension system characterized by the fact that the guide track 81 is designed centrally in relation to the center of rotation 93 of the rotary disc valve body 83.

Another feature of the invention resides broadly in the pneumatic suspension system characterized by the fact that the guide track 81 is formed by a crank which corresponds to the actuator 71, in which is engaged a transmission pin 91 of the rotary disc valve body 83.

Yet another feature of the invention resides broadly in the pneumatic suspension system characterized by the fact that the guide track 81 is formed by a rod body 107 which corresponds to the actuator 71, whereby the rod body 107 is at least partly enclosed by a transmission groove 109 of the rotary disc valve body 83.

Still another feature of the invention resides broadly in the pneumatic suspension system characterized by the fact that the actuator 71 is located non-rotationally at a defined reference point of the control valve 15.

Examples of pneumatic springs, alternatively termed as "air springs" or "air shocks", and components thereof, which may be utilized in accordance with the embodiments of the present invention, may be found in the following U.S. Patents: U.S. Pat. No. 5,180,144, which issued to Hellyer et al. on Jan. 19, 1993; U.S. Pat. No. 5,009,401, which issued to Weitzenhof on Apr. 23, 1991; U.S. Pat. No. 4,988,082, which issued to Pees on Jan. 29, 1991; U.S. Pat. No. 4,332,397, which issued to Stager on Jun. 1, 1982; and U.S. Pat. No. 4,166,522, which issued to Bourcier on Sep. 4, 1979.

Examples of shook absorbers, which may be utilized in accordance with the embodiments of the present invention may be found in the following U.S. Patents: U.S. Pat. No. 4,838,393, entitled "Hydro-mechanical Stop having a Restrictive Passage", which issued to Mourray et al. on Jun. 13, 1989; U.S. Pat. No. 4,817,928, entitled "Suspension System", which issued to Paton on Apr. 4, 1989; U.S. Pat.

No. 4,527,674, entitled "Shock Absorber with a Hydromechanical Stop", which issued to Mourray on Jul. 9, 1985; U.S. Pat. No. 4,962,916, entitled "Compression Spring", which issued to Palinkas on Oct. 16, 1990; and U.S. Pat. No. 4,756,516, entitled "Resiliently Deformable Element Usable as an End Stop in a Motor Vehicle Suspension", which issued to Tondato on Jul. 12, 1988. An example may also be found in the German Patent publication DE-OS P43 04 96.1, entitled "Shock Absorber with Air Shock Module, Air Shock Module for a Shock Absorber and Process for Installation of the Air Shock Module and Shock Absorber."

Examples of suspension systems, which may be utilized in accordance with the embodiments of the present invention may be found in the following U.S. Patents: U.S. Pat. No. 5,286,059, entitled "Height Control System When Vehicle is Jacked Up," which issued to Tabe; U.S. Pat. No. 5,180,024, entitled "Vehicle Height Control Apparatus," which issued to Eto; U.S. Pat. No. 5,324,056, entitled "High Performance Automobile Suspension," which issued to Orton.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The invention as described hereinabove in the context of the preferred embodiments is not to be taken as limited to ell of the provided details thereof, since modifications and variations thereof may be made without departing from the spirit and scope of the invention.

What is claimed is:

1. A pneumatic spring and shock absorber assembly for a motor vehicle, said assembly comprising:

a shock absorber defining a longitudinal axis and an axial direction parallel to the longitudinal axis, said shock absorber comprising:

at least a first container tube, said at least a first container tube defining a chamber therein, said chamber comprising damping medium therein, and said at least a first container tube having a first end portion, a second end portion opposite said first end portion and a length between said first and second end portions;

a piston rod projecting into said at least a first container tube through said first end portion of said at least a first container tube, said piston rod having a first end portion within said at least a first container tube and a second end portion opposite to said first end portion and extending out of said at least a first container tube, said first end portion comprising a first axial end of said piston rod, said second end portion comprising a second axial end of said piston rod, and said piston rod being axially displaceable with respect to said at least a first container tube in the axial direction;

piston means disposed adjacent said first axial end of said piston rod for dividing said chamber into first and second chamber portions; and means for permitting flow of damping medium between said first and second chamber portions;

a pneumatic spring for applying a substantially axially directed force between said piston rod and said at least a first container tube, said pneumatic spring comprising bellows means disposed about said second end portion of said piston rod for containing air under pressure, said bellows means comprising a first end fixedly disposed at said second axial end of said piston rod, and a second end fixedly disposed at said first end portion of said at least a first container tube;

valve means for admitting air under pressure into said bellows means and for permitting air to escape out of said bellows means;

said pneumatic spring further comprising actuator means for operating said valve means to open and close said valve means to permit air into and permit air to escape from said bellow means;

said bellows means defining an interior chamber disposed about said piston rod;

said actuator means being disposed within said interior chamber of said bellows means;

said actuator means comprising means for determining a relative positioning between said piston rod and said at least a first container tube;

said means for determining comprising at least a first portion movable along with one of: said second axial end of said piston rod and said at least a first container tube, and moveable with respect to the other of: said second axial end of said piston rod and said at least a first container tube to determine a relative positioning between said piston rod and said at least a first container tube;

said valve means comprising means for interacting with said at least a first portion of said means for determining to open and close said valve means as a function of the relative positioning between said piston rod and said at least a first container tube;

said actuator means comprising an actuator rod disposed parallel to the longitudinal axis of said shock absorber;

said actuator rod comprising said first portion of said means for determining, and said actuator rod further being disposed to move with one of: said second axial end of said piston rod and said at least a first container tube;

said pneumatic spring comprising said valve means;

said valve means comprising a first portion for admitting air under pressure into said interior chamber of said bellows means, and a second portion for releasing air out of said interior chamber of said bellows means;

said pneumatic spring further comprising a turret tube disposed about said at least a first container tube, said turret tube comprising means for sealing said turret tube to said at least a first container tube;

said bellows means comprising a wall portion disposed between said first and second ends thereof;

said first end of said bellows means being rolled under and disposed radially inwardly of said wall means;

said turret tube having an exterior surface, said exterior surface being configured for permitting said bellows means to roll thereon; and at least said first portion of said valve means being disposed in said turret tube.

2. The assembly according to claim 1, wherein:

said second axial end of said piston rod further comprises an attachment member for attaching said first end of said bellows means thereto;

said attachment member comprises said second portion of said valve means;

said actuator rod extends between said first and second valve means portions;

each of said first and second valve means portions comprise means for interacting with said actuator rod to open and close said first and second valve means portions;

said actuator rod defines a base configuration of said assembly with said second axial end of said piston rod disposed a base distance from said at least a first container tube under a base load between said piston rod and said at least a first container tube, said piston rod being movable into said at least a first container tube from said base configuration under an increased load between said piston rod and said at least a first container tube, and out of said at least a first container tube upon a decrease in load between said at least a first container tube and said piston rod;

said actuator rod is movable along with said piston rod and relative to said at least a first container tube during at least a portion of the movement of said piston rod from said base configuration into said at least a first container tube, and back out of said at least a first container tube to said base configuration; and said actuator rod is movable along with said at least a first container tube and relative to said piston rod during at least a portion of the movement of said piston rod from said base configuration out of said at least a first container tube, and back into said at least a first container tube to said base configuration.

3. The assembly according to claim 2, wherein:

said actuator rod is mounted in a floating manner with respect to each of said first and second valve means portions;

said actuator rod comprises a first end disposed at said first valve means portion and a second end disposed at said second valve means portion;

said turret tube comprises a passage for receiving said first end of said actuator rod therein, said passage further comprises a first passage for providing air under pressure to said first valve means portion;

said first passage comprises a mouth portion opening into said interior chamber of said bellows means;

said first passage comprises a first valve seat adjacent said mouth portion of said first valve portion, said first valve seat being disposed facing away from said mouth portion and into said first passage;

said first end of said actuator rod comprises a first valve body of said first valve means portion, said first valve body being configured for seating against said first valve seat; and said first passage further comprises first biasing means for biasing said actuator rod out of said first passage to engage said first valve body with said first valve seat.

4. The assembly according to claim 3, wherein: said second valve means portion comprises a second passage therethrough, said second passage comprising a second valve seat, said second valve seat having a first seat side disposed towards said interior chamber of said bellows means and a second seat side opposite said first seat side and disposed away from said interior chamber of said bellows means towards an exterior of said pneumatic spring;

said second valve means portion comprises:

a first valve part comprising a second valve body and second biasing means for biasing said second valve body away from said first seat side to open said first seat side of said second valve means portion; and a second valve part comprising a third valve body and third biasing means for biasing said third valve body towards said second seat side to close said second seat side of said second valve means portion, said second valve part comprising a pressure relief valve for permitting air under pressure to flow out of said interior chamber of said bellows means, said third biasing means applying a force to said third valve body to close said second seat side.

5. The assembly according to claim 4, wherein:

said first valve means portion is closed in said base configuration;

said piston rod moving from said base configuration into said at least one container tube moves said actuator rod into said first passage against a force of said first biasing means to open said first valve means portion and permit air under pressure to flow through said first valve means portion and into said interior chamber of said bellows means to move said piston rod back out of said at least a first container tube towards said base configuration;

said second biasing means biases said second valve body away from said first seat side in said base configuration and during a decrease in load applied between said piston rod and said at least a first container tube to permit flow of air from within said interior chamber of said bellows means access to said second valve part of said second valve means portion and flow out of said second valve part when the air pressure within said interior chamber of said bellows means is greater than the force of said third biasing means;

said second valve body is movable against a force of said second biasing means by said second end of said actuator rod during an initial movement of said piston rod into said at least a first container tube to close said first seat side of said second valve means portion and block access to said second valve part by air from said interior chamber of said bellows means; and said force of said first biasing means being greater than said force of said second biasing means to close said first seat side of said second valve means portion prior to opening of said first valve means portion to inhibit flow of air from said interior chamber of said bellows means out of said second valve part of said second valve means portion during inflow of air through said first valve means portion.

6. The assembly according to claim 5, wherein:

said first valve part of said second valve means portion comprises additional means for limiting flow of air to said second valve part;

said first valve seat has an opening cross-sectional area taken substantially perpendicular to said axial direction;

said actuator rod has a cross-sectional area taken substantially perpendicular to the said axial direction; and said first passage has an opening cross-sectional area at said first valve seat, and said opening cross-sectional area of said first passage at said first valve seat being defined by the difference between the opening cross-sectional area of said first valve seat and said cross-sectional area of said actuator rod.

7. The assembly according to claim 6, wherein:

said additional means for limiting flow comprises a cylindrical sleeve within said interior chamber of said bellows means and disposed about said second passage to limit flow of air to said second passage, said cylindrical sleeve having a bore therein, said bore having an opening cross-section; and said second valve body comprises a tubular member, said tubular member being disposed through said bore of said cylindrical sleeve, said tubular member having a first end within said cylindrical sleeve for seating against said first valve seat and a second end opposite said first end, said second end being disposed outside said cylindrical sleeve adjacent said second end of said actuator rod, said tubular member having a cross-section substantially the same as the opening cross-section of said bore to limit flow of air through said bore about said tubular member.

8. The assembly according to claim 7, wherein:

said cylindrical sleeve comprises a cup-shaped member having a base and defining an interior therein, said bore being disposed in said base;

said tubular member has a longitudinal dimension between said first and second ends thereof;

said tubular member comprises a first radial bore adjacent said first end thereof, a second radial bore adjacent said second end thereof, and a longitudinal bore along a substantial portion of the longitudinal dimension of said tubular member between said first and second radial bores, each of said first and second radial bores and said longitudinal bore being configured for permitting flow of air into said interior of said cup-shaped member;

said longitudinal bore defining an opening cross-section;

said tubular member further comprises a disc disposed within said longitudinal bore thereof, said disc having a cross section substantially similar to the opening cross-section of said longitudinal bore to limit flow of air around said disc through said longitudinal bore;

said tubular member comprises biasing means disposed between the first end thereof and said disc to bias said disc towards said second end of said tubular member;

said disc further comprises a pin-shaped extension extending from said disc in a direction towards said second end of said tubular member;

said pin-shaped extension being biased against said second end of said actuator rod; and said disc being movable towards and into said second end of said tubular member when said second end of said actuator rod moves away from said second end of said tubular member, said disc at said second end of said second tubular member no longer blocking said longitudinal bore to permit increased flow of air through said first and second radial bores and said longitudinal bore.

9. The assembly according to claim 8, wherein:

said actuator rod has a first cross section at said first end thereof, and at least one second cross section disposed spaced away from said first end towards said second end of said actuator rod, said second cross section being less than said first cross section to increase said opening cross-sectional area of said first passage at said first valve seat as said actuator rod is moved into said first passage;

said first end of said tubular member of said second valve part comprises a head portion, said head portion having a diameter greater than the diameter of said bore of said cup-shaped member to retain said tubular member within said cup-shaped member and limit movement of said second valve body away from said second seat side;

said second end of said actuator rod comprises a contact member for contacting said second end of said tubular member and said pin-shaped extension of said disc;

said contact member being axially displaceable on said actuator rod to change the length of said actuator rod and thereby change the base configuration of said assembly;

said contact member comprises means for retaining said contact member in a defined position on said second end of said actuator rod;

said at least a first container tube comprises a first container tube and a second container tube, said second container tube being disposed within said first container tube to define an equalization chamber within said shock absorber;

said shock absorber additionally comprises a valve unit disposed between said first and second container tubes at said second end portion of said first container tube;

said first container tube comprises means for attaching said first container tube to a first component;

said second axial end of said piston rod comprises means for attaching said piston rod to a second component;

said pneumatic spring further comprises a first adjustable band for attaching said first end of said bellows means to said attachment member of said second axial end of said piston rod; and said pneumatic spring further comprises a second adjustable band for attaching said second end of said bellows means to said turret tube adjacent said first end portion of said at least a first container tube.

10. The assembly according to claim 1, wherein:

said turret tube comprises a first end disposed adjacent said first end portion of said at least a first container tube;

said second axial end of said piston rod further comprises an attachment member for attaching said first end of said bellows means thereto;

said valve means comprises a rotatable valve body disposed in said turret tube at said first end of said turret tube, said rotatable valve body comprising said first and second valve means portions;

said actuator rod comprises a first end attached to said attachment member for movement of said actuator rod along with said piston rod; and said valve body comprises means for interacting with said actuator rod to open and close said first and second valve means portions.

11. The assembly according to claim 10, wherein:

said turret tube defines a guide channel between said turret tube and said at least a first container tube;

said actuator rod comprises a second end disposed in said guide channel, said second end of said actuator rod being movable into and out of said guide channel during movement of said piston rod into and out of said at least a first container tube; and said actuator rod defines a base configuration of said assembly with said second axial end of said piston rod disposed a base distance from said first end of said turret tube under a base load between said piston rod and said at least a first container tube, said piston rod being movable into said at least a first container tube from said base configuration under an increased load between said piston rod and said at least a first container tube, and out of said at least a first container tube upon a decrease in load between said at least a first container tube and said piston rod.

12. The assembly according to claim 11, wherein:

said actuator rod defines a longitudinal dimension;

said actuator rod comprises guide means disposed along a substantial portion of the longitudinal dimension thereof;

said valve body comprises follower means for engaging with said guide means;

said valve body being rotatable in a plane, the plane being substantially perpendicular to the longitudinal dimension of said actuator rod; and said guide means and said follower means being configured for relatively rotating said valve body to open and close said first and second valve means portions during movement of said actuator rod into and out of said guide channel.

13. The assembly according to claim 12, wherein:

said valve body has a first end, a second end, and defines a longitudinal dimension between said first and second ends;

said valve body has a peripheral surface, said peripheral surface comprises a conical taper from said first end towards said second end;

said turret tube comprises a bore in the first end thereof, said bore comprising a conical taper substantially corresponding to the conical taper of said valve body;

said turret tube comprising a first air passage disposed substantially laterally into said bore, and a second air passage disposed substantially laterally into said bore, said first air passage comprising an air input passage for channelling air under pressure to said valve body, and said second air passage comprises an air outlet passage for permitting air to flow away from said valve body and out of said interior chamber of said bellows means;

said valve body comprising at least one air passage portion having a first opening into said interior chamber of said bellows means and a second opening in said peripheral surface;

said second opening for being aligned with at least one of said first and second air passages of said turret tube to open said at least one of said first and second air passages, and for being out of alignment with both of said first and second air passages to close said first and second air passages; and said valve body being rotatable to both align said second opening of said at least one air passage portion with said at least one of said first and second air passages and move said second opening of said at least one air passage portion out of alignment with said at least one of said first and second air passages.

14. The assembly according to claim 13, wherein:

said actuator rod has a first lateral side and a second lateral side substantially parallel to said first lateral side, said first and second lateral sides being disposed substantially parallel to said longitudinal dimension of said actuator rod;

said guide means comprising a guide track, said guide track comprising:

a first portion disposed substantially intermediate between said first and second lateral sides and intermediate between said first and second ends of said actuator rod;

a second portion offset laterally from said first portion of said guide track towards said first lateral side and disposed between said first portion and said first end of said actuator rod; and a third portion offset laterally from said first portion of said guide track towards the second lateral side and disposed between said first portion and said second end of said actuator rod;

said follower means follows said guide track and moves laterally towards said first lateral side upon movement of said actuator rod into said guide channel to rotate said valve body in a first direction of rotation;

said follower means follows said guide track and moves laterally towards said second lateral side upon movement of said actuator rod out of said guide channel to rotate said valve body in a second direction of rotation;

said valve body with said follower means engaging said guide track at said first portion comprising a first position within said bore with said second opening of said at least one air passage portion out of alignment with both of said first and second air passages;

said valve body with said follower means engaging said guide track at said second portion comprising at least a second position within said bore with said second opening of said at least one air passage portion at least partially aligned with said first air passage; and said valve body with said follower means engaging said guide track at said third portion comprising at least a third position within said bore with said second opening of said at least one air passage portion at least partially aligned with said second air passage.

15. The assembly according to claim 14, wherein:

said follower means is fixedly disposed on said valve body;

said at least one air passage portion comprises first and second air passage portions;

said first air passage portion comprising a first opening into said interior chamber of said bellows means and a second opening disposed angularly offset from said follower means in a first rotational angle about said valve body;

said second air passage portion comprising a first opening into said interior chamber of said bellows means and a second opening disposed angularly offset from said follower means in a second rotational angle about said valve body, said second rotational angle being substantially opposite said first rotational angle;

said first air passage portion is disposed substantially opposite to said second air passage portion;

said first position of said valve body within said bore comprises both said second opening of said first passage portion and said second opening of said second passage portion out of alignment with said first and second air passages;

said at least a second position of said valve body within said bore comprises said second opening of said first passage portion at least partially aligned with said first air passage and said second opening of said second passage portion out of alignment with both said first and second air passages; and said at least a third position of said valve body within said bore comprises said second opening of said second passage portion at least partially aligned with said second air passage and said second opening of said first passage portion out of alignment with both said first and second air passages.

16. The assembly according to claim 15, wherein:

said first and second air passages are disposed substantially 180 degrees from one another;

said second openings of said first and second passage portions are disposed at substantially 120 degrees from one another and each at about 60 degrees with respect to said follower means;

said valve means comprises:
bolt means for mounting said valve body in said bore, said bolt means loosely fitting said valve body in said bore, and
biasing means disposed about said bolt means for biasing said valve body snugly into said bore;

said actuator rod comprises a first surface disposed towards said at least a first container tube and a second surface disposed towards said turret tube;

said first surface having a curved contour between said first and second lateral sides;

said at least a first container tube having a curved contour;

said curved contour of said first surface of said actuator rod substantially matching said curved contour of said at least a first container tube;

said second surface of said actuator rod comprises a first projection adjacent said first lateral side and extending along said longitudinal dimension and a second projection adjacent said second lateral side and extending along said longitudinal dimension;

said guide channel has a base portion disposed away from said at least a first container tube, said base portion comprising grooves for receiving said first and second projections of said actuator rod therein;

said grooves and first and second projections comprising guide surfaces for non-rotationally guiding said actuator rod into and out of said guide channel;

said guide track has a length in said longitudinal dimension of said actuator rod;

said valve body comprises a center of rotation;

said guide track has a depth dimension extending in a direction towards said center of rotation, said depth dimension of said guide track being disposed radially relative to said center of rotation along the length of the guide track;

said guide track comprises one of:
a groove; and
a projecting bead, disposed along said longitudinal dimension of said actuator rod between said first and second lateral sides;

said follower means comprises the other of:
a groove; and
a projecting bead, for following said guide means;

said guide track comprises a fourth portion laterally offset from said second portion towards said first lateral side and disposed between said second portion and said first end of said actuator rod;

said guide track comprises a fifth portion laterally offset from said third portion towards said second lateral side and disposed between said third portion and said second end of said actuator rod;

said pneumatic spring further comprises a first adjustable band for attaching said first end of said bellows means to said attachment member of said second axial end of said piston rod; and said pneumatic spring further comprises a second adjustable band for attaching said second end of said bellows means to said turret tube adjacent said first end portion of said at least a first container tube.

17. A pneumatic spring and shock absorber assembly for a motor vehicle, said assembly comprising:

a shock absorber defining a longitudinal axis and an axial direction parallel to the longitudinal axis;

said shock absorber comprising a container tube for containing damping medium therein;

said shock absorber further comprising a piston rod projecting into said container tube;

said piston rod being axially displaceable with respect to said container tube;

a pneumatic spring for applying a substantially axially directed force between said piston rod and said container tube;

said pneumatic spring comprising a turret tube;

said turret tube being disposed about and in direct contact with a substantial portion of said container tube;

said pneumatic spring further comprising valve means for admitting air under pressure into said pneumatic spring and for permitting air to escape from said pneumatic spring;

said pneumatic spring further comprising actuator means for operating said valve means to permit air into said pneumatic spring and to permit air to escape from said pneumatic spring as a function of a relative positioning between said piston rod and said container tube;

said actuator means comprising an actuator rod;

said actuator rod being disposed parallel to the longitudinal axis of said shock absorber;

said actuator rod being disposed to move partially within a passage defined by said turret tube and with one of: said piston rod and said container tube and movable with respect to the other of: said piston rod and said container tube;

said valve means comprising a first portion for admitting air under pressure into said pneumatic spring;

said valve means further comprising a second portion for releasing air out of said pneumatic spring; and at least one of said first and second valve means portions being disposed in said turret tube.

18. The assembly according to claim 17, wherein:

said pneumatic spring comprises bellows means for containing air under pressure;

said bellows means defines an interior chamber disposed about said piston rod; and said actuator means is disposed within said interior chamber of said bellow means.

19. The assembly according to claim 18, wherein:

said piston rod has a first end portion within said container tube and a second end portion opposite to said first end portion and extending out of said container tube;

said first end portion of said piston rod comprises a first axial end of said piston rod;

said second end portion of said piston rod comprises a second axial end of said piston rod; and said container tube has a first end portion, a second end portion opposite said first end portion and a length between said first and second end portions;

said bellows means comprises a first end fixedly disposed at said second axial end of said piston rod, and a second end fixedly disposed at said first end portion of said container tube.

20. The assembly according to claim 19, wherein:

said container tube is at least a first container tube;

said at least a first container tube defines a chamber, said chamber comprises damping medium therein;

said piston rod projects into said at least a first container tube through said first end portion of said at least a first container tube;

said shock absorber comprises piston means disposed adjacent said first axial end of said piston rod for dividing said chamber of said at least a first container tube into first and second chamber portions;

said shock absorber further comprises means for permitting flow of damping medium between said first and second chambers of said at least a first container tube;

said bellows means comprises a wall portion disposed between said first and second ends thereof;

said first end of said bellows means is rolled under and disposed radially inwardly of said wall portion;

said turret tube comprises means for sealing said turret tube to said container tube; and said turret tube has an exterior surface, said exterior surface being configured for permitting said bellow means to roll thereon.

* * * * *

UNITED STATES PATENT AND TRADEMARK OFFICE
CERTIFICATE OF CORRECTION

PATENT NO. : 5,649,692  
DATED : July 22, 1997  
INVENTOR(S) : Heinz-Jochim Gilsdorf, Joachim Kuhnel and Michael Hurrlein Page 1 of 2

It is certified that error appears in the above-identified patent and that said Letters Patent is hereby corrected as shown below:

In column 8, line 38, after '15', delete "end" and insert --and--.

In column 12, line 58, after 'to', delete "Stager" and insert --Steger--.

In column 13, line 30, after the second occurrence of 'to', delete "ell" and insert --all--.

UNITED STATES PATENT AND TRADEMARK OFFICE
CERTIFICATE OF CORRECTION

PATENT NO. : 5,649,692
DATED : July 22, 1997
INVENTOR(S) : Heinz-Joachim GILSDORF, Joachim KÜHNEL and Michael HURRLEIN It is certified that error appears in the above-identified patent and that said Letters Patent is hereby corrected as shown below:

In column 2, line 2, after 'It', delete "musk" and insert --must--.

In column 6, line 36, after '55', delete "end" and insert --and--.

In column 6, line 57, after '2,', delete "wall" and insert --will--.

In column 8, line 1, after 'the', delete "fastenting" and insert --fastening--.

Signed and Sealed this

Ninth Day of December, 1997

Attest:

Attesting Officer

BRUCE LEHMAN

Commissioner of Patents and Trademarks